Dec. 8, 1964     H. H. WALKER     3,160,133
SUBMARINE VEHICLE
Filed Dec. 28, 1961     2 Sheets-Sheet 1
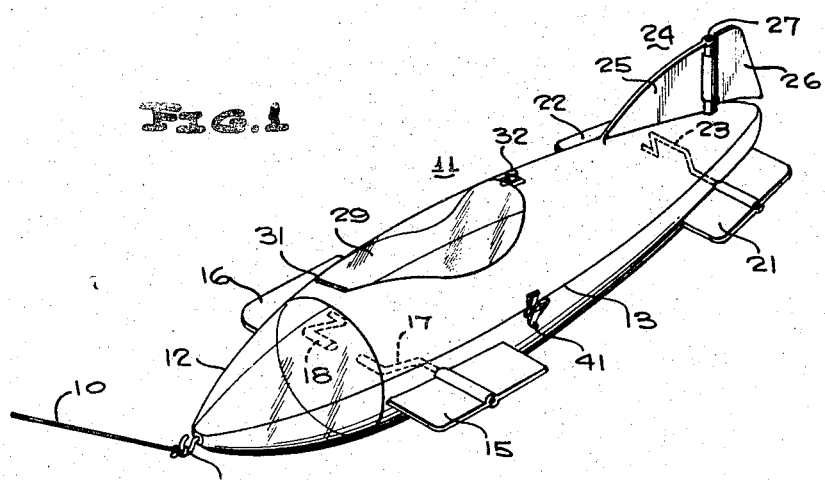
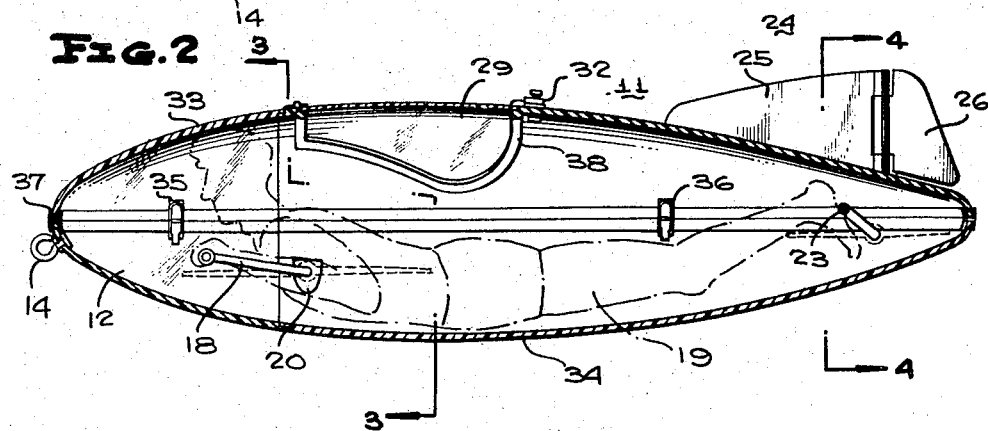
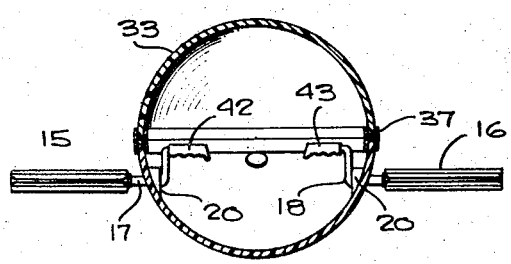
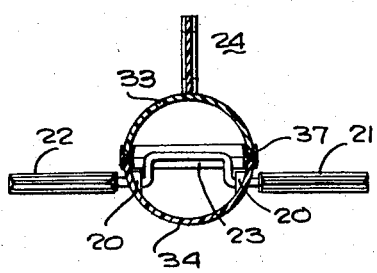
INVENTOR
HAROLD H. WALKER
BY *Hurvitz & Rose*
ATTORNEYS Dec. 8, 1964  H. H. WALKER  3,160,133
SUBMARINE VEHICLE
Filed Dec. 28, 1961  2 Sheets-Sheet 2
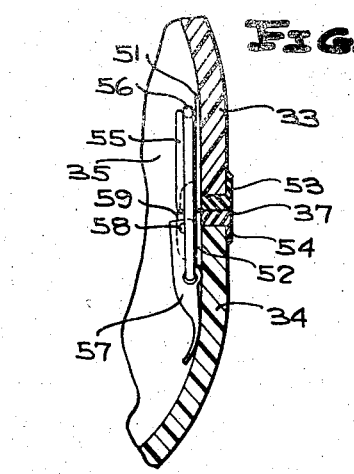
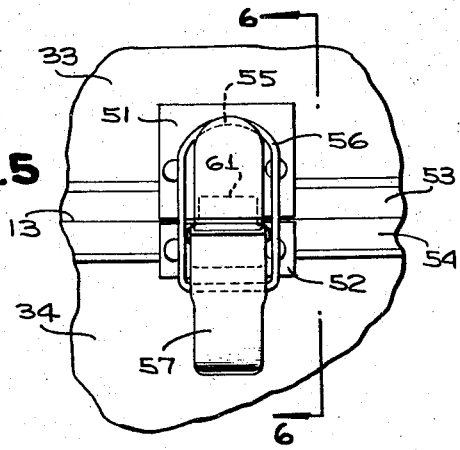
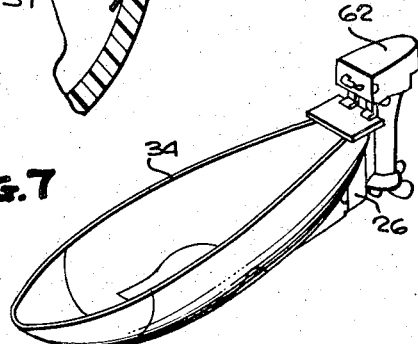
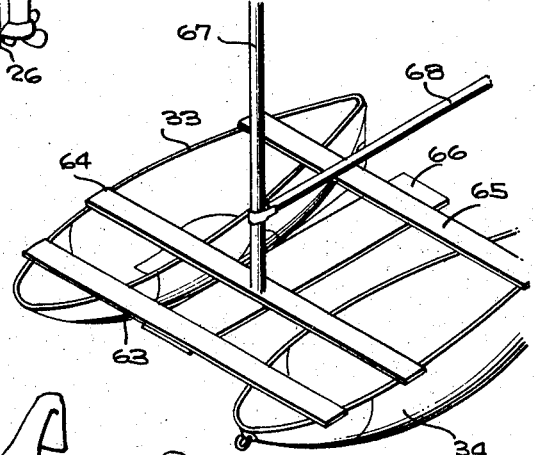
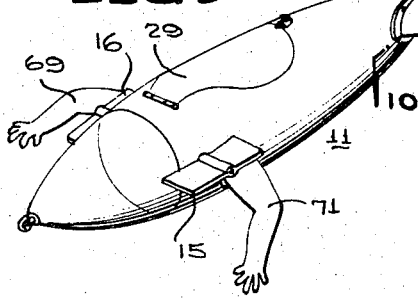
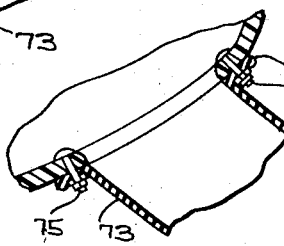
INVENTOR
HAROLD H. WALKER
BY Hurvitz + Rose
ATTORNEYS

United States Patent Office 3,160,133
Patented Dec. 8, 1964

3,160,133
SUBMARINE VEHICLE
Harold H. Walker, 4801 Topping Road, Randolph Hills, Rockville, Md.
Filed Dec. 28, 1961, Ser. No. 162,754
10 Claims. (Cl. 114—16)

The present invention relates generally to vehicles adapted for locomotion under or on the surface of the sea and to skim above the surface of the sea and, more particularly, to a vehicle of this class which is water-tight to carry a rider who manually operates diving planes.

In recent years, great interest has been shown in sea-going pleasure craft and underwater exploration. It would provide great pleasure to many outdoor water enthusiasts to be towed at great speeds in a vehicle which could travel beneath or on the sea's surface or skim above the surface of the sea. Such a vehicle would also be of great benefit to underwater exploration, in addition to sea farming and fishing ground observations.

Underwater exploration devices have generally required the explorer to be exposed to the water and water elements surrounding him. Exposure frequently subjects the explorer to dangerous sea plants and animals, polluted water and extremely cold water. Water buffeting greatly tires explorers utilizing previously available devices such as water sleds. In consequence, at present an explorer cannot stay beneath the water's surface for great periods of time. This greatly hinders the amount of exploration which can be conducted and does not permit optimum utilization of a mother craft from which the explorer may have originally emerged.

The present invention provides a hollow, water-tight vehicle of streamline shape utilizable both for underwater exploration and recreational purposes wherein the person conducting the exploration or engaged in the recreational activity is located interiorly of the vehicle. The vehicle is towed behind a mother towing vehicle by securing a tow line to a cable hook located in the forward end below the horizontal axis. The towing vehicle may be a surface ship, a submarine, helicopter or any other suitable device. Diving planes for controlling vertical craft movement are mounted on the exterior of the vehicle and are manually controlled by the person inside. Since there are no propellers or other protruding objects normal to the horizontal axis of the vehicle, skipping above the water's surface is accomplished with minimum turbulence as the craft leaves and re-enters the water.

Entry to the vehicle interior is by way of pivotable hatch located on the vessel's surface. To permit observation of the underwater surroundings, the forward end of the vehicle's shell is fabricated from a transparent material, such as plastic.

A freely pivotable rudder is mounted on the aft end to enhance vehicle movement through the water as it is being towed. The rudder is freely pivotable to enable the vehicle to respond in an optimum manner in response to movement of the tow line from the mother ship.

A feature of the present invention resides in providing appendages from the exterior surface of the vehicle through which the extremities, i.e., arms and legs, of the pilot may be placed to enable maneuvering into certain areas not otherwise accessible. The arms are withdrawable from these appendages to manually control the diving planes when great alteration of upward and downward movement of the vehicle through the water is desired.

A further feature of the present invention resides in the provision that the upper part of the vehicle is separable from the hull to permit facile transportation and maximum safety to the vehicle riders while it is in use. The upper portion of the vehicle and the hull are secured together by latches located interiorly of the vehicle. When the craft is traveling underwater and the person inside believes he is in possible jeopardy, the latches are opened from the inside, permitting separation of the hull from the upper segment to enable the rider to escape. Also, this feature enables the vehicle to be easily transported since it may be split into two halves having substantially planar open surfaces. With such open surfaces, each half is easily secured to the roof of an automobile or to the deck or cabin of a boat. Each half of the vessel is also utilizable as a floating boat, such as a canoe, or the lower and upper halves may be employed together as a single boat of the catamaran type.

It is an object of the present invention to provide a new and improved vehicle capable of underwater, water-surface, or above-water skimming locomotion, which vehicle has manual course control means.

It is a further object of the present invention to provide an underwater exploring device having a manually controlled, course-control means wherein the person conducting the explorations is not subject to explosure from underwater elements.

It is a further object of the present invention to provide a water-tight, underwater vehicle designed to carry at least one person wherein the vehicle is towed from a mother vehicle and the person within the towed vehicle is capable of controlling its vertical position in the water by manual means with minimum effort.

It is an additional object of the present invention to provide a completely enclosed, towed vehicle capable of operating at high speeds underwater, on the water and in skimming relation to the water's surface, which vehicle is manually controllable in the vertical plane and which permits its riders to stay below the surface of the water for long periods of time without adverse effects.

It is yet another object of the present invention to provide a new and improved underwater vehicle from which escape is facile.

It is a further object of the present invention to provide and underwater, water-tight vessel which is separable into two parts from the interior of the vessel so that escape therefrom in case of emergency is possible.

It is yet another object of the present invention to provide an underwater pleasure craft and underwater exploration craft which is easily transported because it is separable into two separate parts.

A further object of the present invention is to provide a new and improved underwater vehicle having manually controlled diving planes and appendages for the extremities of its pilot wherein the appendages enable the vehicle to be guided into normally inaccessible underwater areas.

The above and still further objects, features and advantages of the present invention will become apparent upon consideration of the following detailed description of one specific embodiment thereof, especially when taken in conjunction with the accompanying drawings, wherein:

FIGURE 1 of the drawings is a perspective view of the vessel according to the present invention;

FIGURE 2 is a side view of the vessel illustrated in FIGURE 1;

FIGURE 3 is a sectional view taken along the lines 3—3 of FIGURE 2;

FIGURE 4 is a sectional view of the aft end of the vessel illustrated in FIGURE 2 taken along the lines 4—4 thereof;

FIGURE 5 is a plan view of a latch mechanism utilized in the vessel of the present invention;

FIGURE 6 is a side view of the latch illustrated in FIGURE 5 taken along the line 6—6 thereof;

FIGURE 7 is an illustration of the manner in which one-half of the vessel may be utilized as a canoe;

FIGURE 8 is an illustration showing the manner in which both separable halves of the vessel are utilizable as a catamaran sail boat;

FIGURE 9 is an illustration of a further embodiment of the present invention utilizing appendages for the arms and legs of a person interior of the vessel; and FIGURE 10 is a sectional view taken along lines 10—10 of FIGURE 9.

Reference is now made to FIGURE 1 of the drawings which includes a water-tight, hollow vessel 11 of streamlined form which is preferably fabricated of a light, hard material. The forward end 12 of the vessel 11 is fabricated from a transparent material, such as a plastic, to enable a person located inside the vessel to look outside for exploration and observation of the water surroundings. A pair of diving planes 15 and 16, for controlling the vertical course of the vehicle, extends from the vessel's exterior surface and is located towards the forward end. Connected to diving planes 15 and 16 are operating levers 17 and 18, respectively, for pivoting the diving planes with respect to the horizontal axis 13 of the vessel. Levers 17 and 18 extend from the respective diving planes through apertures in the craft shell inwardly of the vessel. Each of the levers 17 and 18 has a right-angle bend projecting toward the forward end of the boat and another right-angle bend extending further within the vessel. Such construction permits the person 19, located interiorly of vessel 11, to place his hands in the optimum operating position for pivoting diving planes 15 and 16 and maintains the size of the vessel to a minimum. Of course, it is to be understood that the vehicle may be dimensioned to accommodate more than one person in the prone or sitting positions.

As seen in FIGURE 3, handles 42 and 43 are secured to the interior, horizonal portions of pivotable bars 17 and 18, respectively, to enable pilot 19 to control diving planes 15 and 16 with minimum effort. To permit maximum angle dives to be made with the present vessel, diving planes 21 and 22 are located on either side of the aft end of the boat. Diving planes 21 and 22 are actuated by the feet of the pilot by a single connecting rod 23 having a rectangular-shaped midsection, between the two arms which drive diving planes 21 and 22. The arms of diving planes 21 and 22 extend through apertures in the aft end of the craft. To prevent water seepage through the shell apertures for levers 17 and 18 and rod 23, sealing blocks 20 through which these connecting elements extend are provided within the craft.

Rudder 24, having a fixed segment 25 and a further segment 26 freely pivotable about shaft 27, is provided at the aft end of the vessel to permit maximum maneuverability thereof and quick response to movement of cable 10 with respect to the starboard or port sides of the vessel.

Secured below the horizontal axis 13 of the vessel at the forward end thereof is a cable hook 14 to which a tow cable 10 is secured. The other end of tow cable 10, not shown, is secured to the mother vehicle which is towing the vessel 11.

To enable ingress and egress of a vehicle rider to the interior of the boat, hatch 29 is provided on the vessel's upper segment 38. Hatch 29 is pivotable about hinge 31 and is secured in place by latch 32. As best seen in FIGURE 2, latch 32 is of the conventional push-button type, actuated from either the interior or the exterior of the vessel 11. Gasket set 38, surrounding the hatch 29, serves to prevent water seepage to the interior of the boat.

Sufficient air is maintained in the vehicle 11 to enable rider 19 to remain under water for substantial time periods. To replenish the air supply the vehicle is brought to the water's surface and hatch 29 is opened. If the rider desires to stay beneath the water's surface for prolonged time periods, he may be equipped with self-contained, underwater breathing apparatus or a snorkel communicating with the mother ship or above the water's surface may be employed. Also, it is possible to include an air supply within the vessel.

As seen in FIGURE 2, vessel 11 comprises two hollow segments or hulls, an upper segment 33 and a lower segment 34, separable from each other about horizontal axis 13. Each of the segments 33 and 34 is hollow and, when separated, has a rim which is substantially planar. When the craft is being utilized for underwater locomotion, the two separable segments are joined together by a plurality of latches, only latches 35 and 36 being shown on FIGURE 2. Latches 35 and 36 are located on the interior surface of the vessel 11 to permit rider 19 to quickly escape, if necessary. A gasket 37, sealed in position by latches 35 and 36, extends between the two separable segments 33 and 34 and prevents water from reaching the interior of the vessel to maintain it watertight.

A plurality of latches, only one of which is shown as 41, are located on the exterior of the vessel 11 and remain open during occupancy of the vessel by a person. These latches permit the vessel to be stored or transported as an integral unit, if desired.

Reference is now made to FIGURES 5 and 6 of the drawings which illustrate one specific embodiment for the latches 35, 36 and 41. Each of the latches 35, 36 and 41 comprises a pair of base plates 51 and 52 of planar dimensions, the base plates 51 and 52 being located on segments 33 and 34, respectively. Axis 13 serves as the dividing line between the two rubber sealers 53 and 54 which comprise gasket 37. Sealer 53 is secured to the lower rim of segment 33 while sealer 54 is secured to the upper rim of segment 34.

Extending from base 51 is a rib 55 having an indented top surface in which the circular portion of catch 56 is located when the latch is utilized for securing segments 33 and 34 together. Catch 56 is rotatable about an aperture provided in tongue 57, mounted on base 52. Tongue 57 is pivotable about axis 58 which is secured to housing 59 within which catch 61 is mounted. Housing 59 is mounted on base plate 52 and consequently tongue 57 may be considered as secured to the base plate 52. In the lock position for latch 35, tongue 51 extends from its housing into a slot provided in rib 55.

To open the latch, tongue 57 is pivoted about axle 58 away from the surface of segment 34. Thereby, catch 56 is raised above the indentation between the base plate 51 and the outer surface of rib 55. Catch 56 is then free to rotate below axis 13 between the two mating surfaces of sealers 53 and 54. After each of the latches has been unlocked, the upper segment 33 is removable from lower segment 34 by merely translating the two segments relative to each other. Catch 61, which is fixed relative to base plate 52, easily slides from the slot in rib 55 which it engages while the latches are locked.

With the vessel in its separated position, it is usable either as a motor boat, as illustrated in FIGURE 7, or a catamaran, as illustrated in FIGURE 8. In addition, separated lower segment 34 may be utilized as a canoe. When the separated upper segment 33 is employed as a motor boat, an outboard motor 62 is secured to the aft end thereof in the conventional manner. Rotatable rudder section 26 is utilized with this type of boat for steering in the conventional manner.

To provide a catamaran type of boat, the separable segments 33 and 34 are connected together with their horizontal axes parallel. Each of the segments 33 and 34 is connected by a plurality of cross planks 63, 64, and 65, which are secured to vessels 33 and 34 by any suitable clamping means. To provide stability for the thus-formed catamaran, an additional plank 66 extends axially of segments 33 and 34 at a point approximately half way therebetween. If desired, a sail is mounted on vertically extending rod 67 and control thereof is effected by horizontally extending rod 68. When utilizing the segment 34 for a canoe, catamaran, etc., arms 17 and 18 and diving planes 15, 16, 21 and 22 may be retained in place or removed. To remove arms 17 and 18, it is merely necessary to dismount diving planes 15 and 16 therefrom and withdraw the segments of arms 17 and 18 which extend through the apertures in the hull for which they are provided. For this purpose, bar 23 is fabricated from three separate pieces, one piece extending through each of the apertures in the aft end of the vessel and the other piece containing two right angle bends. Diving planes 21 and 22 are removable from the arms extending through the apertures in segment 34 to permit complete disassembly of the rear diving plane section. Of course, when segment 34 is utilized as a shell-type boat with the diving planes removed, the blocks 20 through arms 17, 18 and 23 extend are filled with some suitable sealer.

Reference is now made to FIGURES 9 and 10 of the present invention wherein another embodiment is disclosed. In this embodiment, four appendages 69, 71, 72 and 73 are secured to the exterior surface of vessel 11 for receiving the extremities of the rider. Appendages 69 and 71, located towards the forward end of the vessel 11, are designed of such size and shape to receive the arms of the person while appendages 72 and 73, located at the aft end of the vessel 11 are dimensioned to receive his legs. Appendages 69, 71, 72 and 73 are fabricated from a flexible material to permit the vessel and the person inside to move about in the water with maximum maneuverability. Of course, appendages 69, 71, 72 and 73 are water-tight to prevent leaks.

The arm appendages 69 and 71 permit the person within the vessel to grasp an object which is in his way or of interest. The arm appendages 69 and 71 are located almost immediately below the manually operated diving planes 15 and 16. Diving planes 15 and 16, illustrated in FIGURE 9 are of the same type as those illustrated in FIGURE 2 and are operated by the vessel pilot in exactly the same manner as the diving planes of FIGURE 2. For vertical ascent and descent, the arms are withdrawn from appendages 69 and 71 and are positioned on handles 42 and 43 to control diving planes 15 and 16. Ingress and egress to the vessel 11 of FIGURE 9 is accomplished in substantially the same manner as for the embodiment previously discussed, i.e., through pivoted hatch 29.

FIGURE 10 discloses the manner in which each of the appendages 69, 71, 72 and 73 is secured to the vessel 11. The appendage 13 tubing adapted to receive the leg of the person within vessel 11 is secured at its ends by means of nut and bolt assemblies 75 which are located about the periphery of the circular aperture in hull 11 through which the arms and legs of the rider extend. A circular flange 76 extending from appendage 73 serves as a sealer for the aperture about which it is secured.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A towed vehicle adapted for locomotion under, on or above the water surface comprising a water-tight streamlined vessel adapted to carry at least one person interiorly thereof, course controlling means extending from the exterior of said vessel, said course controlling means including a pair of diving planes extending from opposite sides of said vessel in the forward section thereof, means for manually activating said diving planes, said last-named means consisting of a lever arm for each of said diving planes, each of said lever arms extending in generally horizontal planes interiorly of said vessel from the surface of said vessel, each of said lever arms being positioned to be directly activated by the hands of said person, and a tow hook for a towing rope, said hook being mounted on the bow of said vessel below the horizontal axis thereof, said vessel being streamlined in the direction of tow from said hook.

2. The vehicle of claim 1 further including a hatch for ingress and egress of a person located interiorly of said vessel.

3. The vehicle of claim 1 further including flexible, water-tight appendages from the vessel for the extremities of a person located interiorly of said vessel, said appendages extending from the exterior surface of said vessel, the interior of said appendages communicating directly with the interior of said vessel.

4. The vehicle of claim 1 wherein said control means includes a vertically extending rudder having a stationary forward segment and freely pivotable rear section.

5. The vehicle of claim 1 wherein said course control means includes another pair of diving planes generally rearwardly positioned on said vessel, means for activating said another pair of diving planes, said last-named means consisting of lever arm means for each of said diving planes, said lever arm means extending in a generally horizontal plane interiorly of said vessel from the surface thereof and being positioned to be engaged by the feet of said person when the person lies down in the vehicle.

6. A towed vehicle adapted for locomotion under or on the water's surface comprising a water-tight, streamlined vessel adapted to carry at least one person interiorly thereof, said vessel comprising two streamlined-surface, separable, mating, hollow segments having their longitudinal axes substantially parallel to the longitudinal axis of the vessel, each of said segments extending substantially throughout the length of said vessel, means mounted on the interior of said vessel for securing said segments together and for at will separating said segments from each other, course-controlling means extending from the exterior of said vessel, said course-controlling means including a pair of diving planes extending from one of said segments and generally forwardly positioned on said vessel, means for manually activating said diving planes, said last-named means consisting of a lever arm for each of said diving planes, said lever arms extending in generally horizontal planes interiorly of said vessel from the surface thereof, each of said lever arms being positioned to be directly activated by the hands of said person, and a tow hook for a towing rope, said hook being mounted on the bow of said vessel below the horizontal axis thereof, said vessel being streamlined in the direction of tow from said hook.

7. The vehicle of claim 6 wherein said course-controlling means further includes a vertically extending rudder having a stationary forward segment and freely pivotable rear section.

8. A vehicle adapted for locomotion under or on the water's surface comprising a water-tight, streamlined vessel adapted to carry at least one person interiorly thereof, said vessel comprising two streamlined-surface, separable, mating, hollow segments having their longitudinal axes substantially parallel to the longitudinal axis of the vessel, each of said segments extending substantially throughout the length of said vessel, means mounted on the interior of said vessel for securing said segments together and for at will separating said segments from each other, course-controlling means extending from the exterior of said vessel, said course-controlling means including a pair of diving planes extending from one of said segments and generally forwardly positioned on said vessel, means for manually activating said diving planes, said last-named means consisting of a lever arm for each of said diving planes, said lever arms extending in generally horizontal planes interiorly of said vessel from the surface thereof, each of said lever arms being positioned to be directly activated by the hands of said person, wherein said course-controlling means further includes a vertically extending rudder having a stationary forward segment and freely pivotable rear section, wherein said course control means includes another pair of diving planes generally rearwardly positioned on said vessel, means for activating said another pair of diving planes, said last-named means consisting of lever arm means for each of said diving planes, said lever arm means extending in generally horizontal planes interiorly of said vessel from the surface thereof and being positioned to be engaged by the feet of said person when the person lies down in the vehicle.

9. The vehicle of claim 8 further including a hatch in one of said segments for permitting ingress and egress of said person, the forward end of said vessel being transparent to provide an unobstructed view for said person to environment outside the forward end of the vessel.

10. A vehicle adapted for locomotion under or on the water's surface, comprising a water-tight, streamlined vessel adapted to carry at least one person interiorly thereof, course-controlling means extending from the exterior of said vessel, said course-controlling means including a pair of diving planes, and means for manually activating said diving planes, said last-named means consisting of a lever arm for each of said diving planes, each of said lever arms extending in generally horizontal planes interiorly of said vessel from the surface of said vessel, each of said lever arms being positioned to be directly activated by the hands of said person, wherein said course control means includes another pair of diving planes generally rearwardly positioned on said vessel, means for activating said another pair of diving planes, said last-named means consisting of lever arm means for each of said diving planes, said lever arm means extending in a generally horizontal plane interiorly of said vessel from the surface thereof and being positioned to be engaged by the feet of said person when the person lies down in the vehicle.

References Cited in the file of this patent

UNITED STATES PATENTS

| | | |
|---|---|---|
| 894,495 | Graichen | July 28, 1908 |
| 1,125,772 | Ullin | Jan. 19, 1915 |
| 1,178,874 | Ramons | Apr. 11, 1916 |
| 1,259,201 | Barringer | Mar. 12, 1918 |
| 1,997,149 | Lake | Apr. 9, 1935 |
| 2,377,442 | Osterhoudt | June 5, 1945 |
| 2,395,892 | Lontz | Mar. 5, 1946 |
| 2,431,061 | Mayo | Nov. 18, 1947 |
| 2,685,858 | Harrison | Aug. 14, 1954 |
| 2,823,636 | Gongwer | Feb. 18, 1958 |
| 2,998,798 | Love | Sept. 5, 1961 |
| 3,000,022 | Cathey | Sept. 19, 1961 |
| 3,045,636 | Thomas et al. | July 24, 1962 |
| 3,065,722 | Green | Nov. 27, 1962 |

FOREIGN PATENTS

| | | |
|---|---|---|
| 644,267 | Great Britain | Oct. 4, 1950 |
| 1,183,743 | France | Feb. 2, 1959 |
| 1,223,266 | France | Feb. 1, 1960 |
| 591,010 | Italy | Apr. 11, 1959 |